United States Patent
Satyanarayanan et al.

(10) Patent No.: US 8,441,516 B2
(45) Date of Patent: May 14, 2013

(54) SERVICE LEVEL VIEW OF AUDIOVISUAL CONFERENCE SYSTEMS

(75) Inventors: Ottalingam Satyanarayanan, Fremont, CA (US); Sachin Saswade, Milpitas, CA (US); Todd Lizambri, Frederick, MD (US)

(73) Assignee: Cisco Technology, Inc., San Jose, CA (US)

( * ) Notice: Subject to any disclaimer, the term of this patent is extended or adjusted under 35 U.S.C. 154(b) by 1254 days.

(21) Appl. No.: 12/246,895

(22) Filed: Oct. 7, 2008

(65) Prior Publication Data

US 2010/0085417 A1 Apr. 8, 2010

(51) Int. Cl.
*H04N 7/14* (2006.01)

(52) U.S. Cl.
USPC ................................ 348/14.09; 348/14.08

(58) Field of Classification Search ............... 348/14.08, 348/14.09
See application file for complete search history.

(56) References Cited

U.S. PATENT DOCUMENTS

| | | | | | |
|---|---|---|---|---|---|
| 4,531,024 | A | * | 7/1985 | Colton et al. | 379/93.14 |
| 5,124,912 | A | * | 6/1992 | Hotaling et al. | 705/7.19 |
| 5,491,743 | A | * | 2/1996 | Shiio et al. | 709/204 |
| 5,781,731 | A | * | 7/1998 | Koreeda et al. | 709/204 |
| 5,805,846 | A | * | 9/1998 | Nakajima et al. | 715/753 |
| 6,173,422 | B1 | * | 1/2001 | Kimura et al. | 714/57 |
| 6,938,069 | B1 | * | 8/2005 | Narayanaswamy | 709/204 |
| 7,069,298 | B2 | * | 6/2006 | Zhu et al. | 709/204 |
| 7,236,976 | B2 | * | 6/2007 | Breitenbach et al. | 707/802 |
| 7,353,251 | B1 | * | 4/2008 | Balakrishnan | 709/204 |
| 7,677,464 | B1 | * | 3/2010 | Donohue | 236/1 B |
| 2003/0103075 | A1 | * | 6/2003 | Rosselot | 345/717 |
| 2003/0142201 | A1 | * | 7/2003 | Babka et al. | 348/14.09 |
| 2004/0080610 | A1 | * | 4/2004 | James et al. | 348/14.09 |
| 2004/0128350 | A1 | * | 7/2004 | Topfl et al. | 709/204 |
| 2005/0144233 | A1 | * | 6/2005 | Kjesbu et al. | 709/204 |
| 2006/0256187 | A1 | * | 11/2006 | Sheldon et al. | 348/14.01 |
| 2007/0005809 | A1 | * | 1/2007 | Kobayashi et al. | 709/250 |
| 2007/0143402 | A1 | * | 6/2007 | Kumagai | 709/204 |
| 2007/0288610 | A1 | * | 12/2007 | Saint Clair et al. | 709/220 |
| 2008/0012936 | A1 | * | 1/2008 | White | 348/14.16 |
| 2008/0068447 | A1 | * | 3/2008 | Mattila et al. | 348/14.08 |
| 2008/0225111 | A1 | * | 9/2008 | Honobe | 348/14.05 |
| 2009/0051756 | A1 | * | 2/2009 | Trachtenberg et al. | 348/14.08 |

(Continued)

OTHER PUBLICATIONS

Anonymous, "Telepresence Managed Services," 1 page, published by Teliris, Inc., United States, downloaded Jan. 27, 2009.

(Continued)

*Primary Examiner* — Christopher M Brandt
(74) *Attorney, Agent, or Firm* — Hickman Palermo Truong Becker Bingham Wong LLP

(57) ABSTRACT

In an embodiment, a machine-readable volatile or non-volatile storage medium stores one or more sequences of instructions which, when executed by one or more processors, cause the one or more processors to perform monitoring a plurality of video conference locations, each of the locations comprising one or more video conference rooms, resulting in creating and storing monitored data; generating service level view data which when displayed on a video display unit concurrently comprises graphical representations of all the locations and all the rooms, and graphical representations of faults associated with each of the rooms. Rooms can include coder-decoders (codecs), cameras, video monitors, and network packet data routing or switching elements. Embodiments provide a holistic view of all video conference rooms in a deployment, with aggregated call usage, quality and fault data, with highly useful graphical management displays.

26 Claims, 6 Drawing Sheets

U.S. PATENT DOCUMENTS

| | | | |
|---|---|---|---|
| 2009/0204916 A1* | 8/2009 | Benedek et al. | 715/764 |
| 2009/0309955 A1* | 12/2009 | Gladstone | 348/14.04 |
| 2009/0309956 A1* | 12/2009 | Hawkins et al. | 348/14.08 |
| 2010/0046553 A1* | 2/2010 | Daigle et al. | 370/474 |

OTHER PUBLICATIONS

Anonymous, "Tandberg Management Suite", 1 page (screen shot from Flash video demonstration on web site), published by Tandberg, United States, downloaded Jan. 27, 2009.

Anonymous, "Halo's Monthly End-to-End Managed Solution," published by Hewlett Packard Development Company, L.P., Palo Alto, California, United States, 2 pages, 2007.

Anonymous, "Polycom Telepresence Video Network Operations Center (VNOC)," 1 page, published by Polycom, Westminster, Colorado, United States, 1 page, downloaded Jan. 27, 2009.

Anonymous, "Cisco Telepresence Manager 1.5 Data Sheet," 6 pages, published by Cisco Systems, Inc., San Jose, California, United States, Jan. 2009.

Anonymous, "ReadiManager Operator's Guide," 70 pages, published by Polycom, Inc., Westminster, Colorado, 2007.

* cited by examiner

SERVICE LEVEL VIEW OF AUDIOVISUAL CONFERENCE SYSTEMS

TECHNICAL FIELD

The present disclosure generally relates to network management. The disclosure relates more specifically to managing audiovisual conference systems.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Contemporary video conference systems that use packet-switched networks and protocols may consist of cameras, video monitors, microphones, loudspeakers, coder-decoders (codecs), and high-performance network packet routing and switching equipment. These video conference systems can provide a high-quality end-user experience if correct configuration and provisioning is achieved for the network elements involved in the audio/video path, and if fault conditions are monitored so that problems can be corrected. Users and administrators are also interested in knowing whether network elements are adhering to service level agreements (SLAS) that require particular levels of bandwidth, throughput or quality.

DETAILED DESCRIPTION

Figure 1:
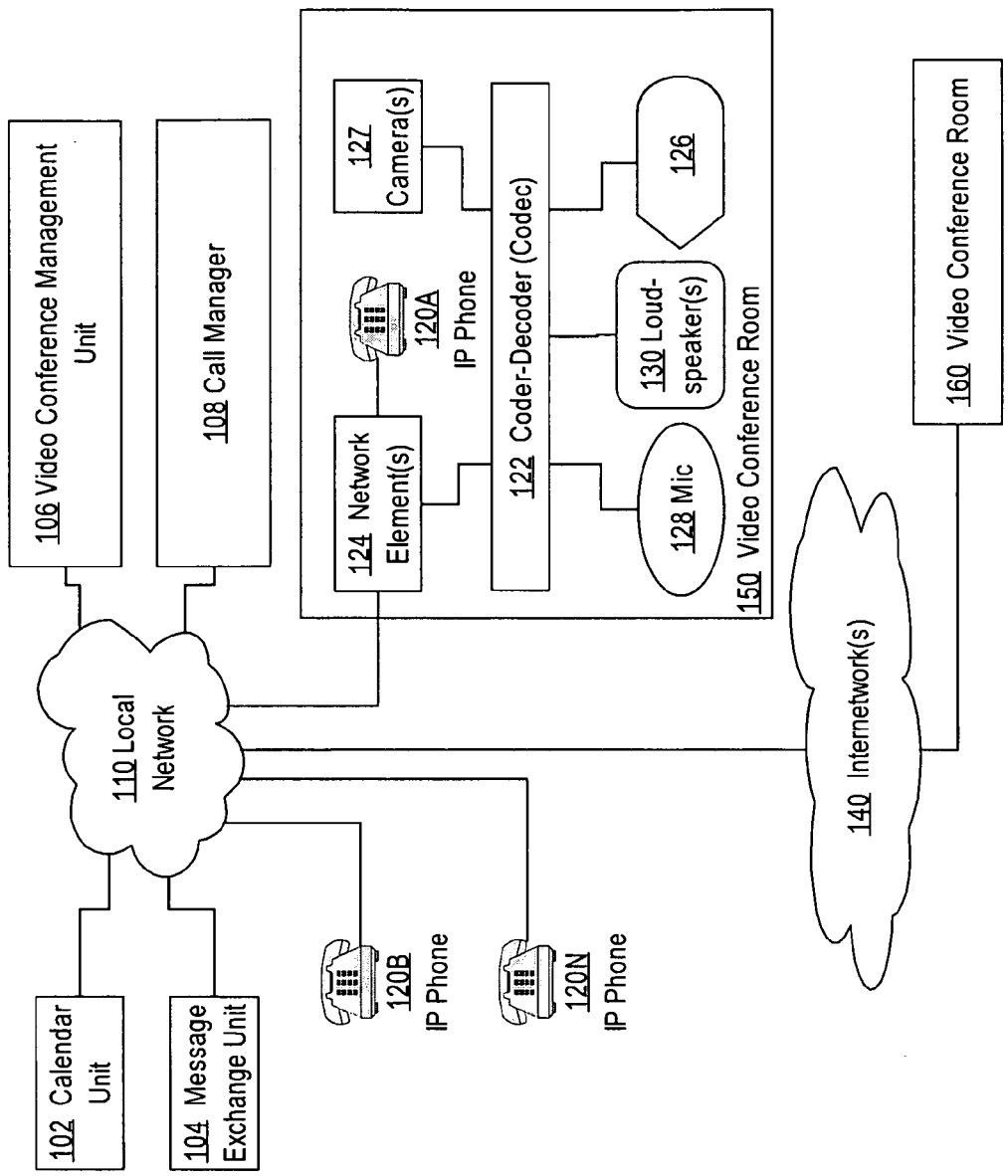
FIG. 1 illustrates a networked video conference system.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Implementation Mechanisms—Hardware Overview
4.0 Extensions and Alternatives 1.0 General Overview In an embodiment, a machine-readable volatile or non-volatile storage medium stores one or more sequences of instructions which, when executed by one or more processors, cause the one or more processors to perform monitoring a plurality of video conference locations, each of the locations comprising one or more video conference rooms, resulting in creating and storing monitored data; based on the monitored data, generating service level view data which when displayed on a video display unit concurrently comprises graphical representations of all the locations and all the rooms, and graphical representations of faults associated with each of the rooms. Embodiments provide a holistic view of all video conference rooms in a deployment, with aggregated call usage, quality and fault data, with highly useful graphical management displays. Thus, in an embodiment, each of the rooms may comprise at least one codec, one or more cameras, one or more video monitors, and one or more network packet data routing or switching elements.

In an embodiment, the machine-readable medium further comprises instructions which when executed causes the generation of service level view data that presents all rooms associated with a plurality of different customers each having a plurality of locations and a plurality of rooms within the locations.

In an embodiment, the graphical representations of faults are generated and displayed in near real time in relation to a time at which the monitoring is performed.

In an embodiment, the machine-readable medium further comprises instructions which when executed cause displaying in association with the service level view one or more of: total calls previously processed by all the locations and rooms; total number of then currently active video conference meetings involving all the locations and rooms; or percentage of current usage of all the locations and rooms.

In an embodiment, the machine-readable medium further comprises instructions which when executed cause displaying in association with the service level view one or more of: total number of all the rooms; total number of devices in all the rooms.

In an embodiment, the machine-readable medium further comprises instructions which when executed cause displaying in association with the service level view one or more of: total number of travel mileage saved from use of all the video conference locations and rooms; total cost savings from use of all the video conference locations and rooms.

In an embodiment, the machine-readable medium further comprises instructions which when executed cause displaying the rooms as selectable hyperlinks associated with the rooms, receiving user input selecting one of the hyperlinks, and displaying room level view data for that room associated with the selected one of the hyperlinks. In an embodiment, the machine-readable medium further comprises instructions which when executed cause displaying a table of alerts associated with all rooms shown in the service level view, wherein the alerts comprise alert identifiers, alert names, and one or more the selectable hyperlinks which when selected cause launching one or more of a trouble ticket system and an impact analysis system.

In an embodiment, the room level view data comprises a graphical representation of each of the at least one codec, one or more cameras, one or more video monitors, and one or more network packet data routing or switching elements, and comprises a graphical representation of a fault status of each of the at least one coder-decoder (codec), one or more cameras, one or more video monitors, and one or more network packet data routing or switching elements; further comprising instructions which when executed cause re-displaying the table of alerts to show only those alerts that are associated with the room represented in the room level view.

In an embodiment, the machine-readable medium further comprises instructions which when executed cause displaying in association with the service level view one or more graphical representations of currently active paths connecting two or more rooms that are currently involved in a video conference call.

In other embodiments, the invention encompasses a computer apparatus and a data processing method configured with means or process steps corresponding to the functional steps represented in the instructions described above.

2.0 Structural and Functional Overview

FIG. 1 illustrates a networked video conference system. In an embodiment, a calendar unit 102, message exchange unit 104, video conference management unit 106, and call manager 108 are communicatively coupled to a local network 110, which is also coupled to a plurality of Internet Protocol (IP) phones 120A, 120B, 120N. In an embodiment, each of the IP phones comprises a Cisco IP Phone 7970G, commercially available from Cisco Systems, Inc., San Jose, Calif.

In an embodiment, the calendar unit 102 comprises a computer, process, firmware, software elements, or a combination thereof, configured to manage a calendar for an individual, group, or other entity. In an embodiment, calendar unit 102 comprises an instance of a calendar computer program, such as MICROSOFT OUTLOOK.

In an embodiment, message exchange unit 104 comprises a computer, process, firmware, software elements, or a combination thereof, configured to manage messages such as electronic mail for an individual, group, or other entity. In an embodiment, message exchange unit 104 comprises a message exchange computer program, such as MICROSOFT EXCHANGE SERVER.

In an embodiment, video conference management unit 106 comprises a computer, process, firmware, software elements, or a combination thereof, configured to perform video conference call scheduling, fault monitoring, quality of service provisioning, and service level agreement (SLA) monitoring for network elements involved in video conference calls. In an embodiment, video conference management unit 106 is configured to perform the functions that are further described herein.

In an embodiment, call manager 108 comprises a computer, process, firmware, software elements, or a combination thereof, configured to establish voice over Internet Protocol (VoIP) calls or video conference calls among IP phones and other nodes in a networked system. In an embodiment, call manager 108 comprises Cisco Call Manager, commercially available from Cisco Systems, Inc., San Jose, Calif.

In an embodiment, one or more of the IP phones 120A, 120B, 120N is deployed in a video conference room 150 as shown in FIG. 1 for IP phone 120A. In an embodiment, a video conference room 150 is coupled to local network 110 through one or more network elements 124 such as switches or routers. In an embodiment, room 150 further comprises a coder-decoder (codec) 122 coupled to one or more microphones 128, one or more loudspeakers 130, one or more video monitors 126, and one or more cameras 127. Cameras may comprise document cameras or cameras for capturing images of persons or things participating in a video conference.

Although the term "room" is used for purposes of illustrating a clear example, the elements of room 150 may be deployed in any location in association with one another. Further, network element(s) 124 broadly represents logical entities that facilitate video conference call placement and communication, such as Session Initiation Protocol (SIP) proxies.

Other elements that are monitored by the system may include virtual agents that provide integration with contact centers, unified conferencing systems, session border controllers, IP-to-IP gateways, directory servers such as LDAP servers, and other elements.

Local network 110 may be communicatively coupled directly or indirectly through one or more other local networks, wide area networks, or internetworks 140 to another video conference room 160.

In an embodiment, the video conference management unit 106 comprises a quality of service management subsystem that provides quality of service (QoS) provisioning and monitoring, a fault management subsystem, and assurance of service level agreement (SLA) terms. Embodiments provide active monitoring of the network elements involved in the audio path and video path of video conferences, and can display a system-level view for video conferences. The network elements that are monitored may include all elements of video conference room 150, 160, as well as routers, switches and other elements that are in a network path between the rooms.

The video conference management unit 106 may comprise or may be coupled to a computer or video display to receive the display of the system-level view. In an embodiment, a video conference Service Level View provides information regarding the health, performance, availability, and return-on-investment aspects of a video conference system in a holistic management framework. By collecting data from all video conference devices, rooms and locations in a deployment, problems can be correlated and associated with calls and the overall status of a location, room or call can be determined, resulting in more useful and effective management displays. In an embodiment, the operational status of a room 150, 160 is associated with the elements that are physically located within the room, and the status is also associated with the logical components that support video conference room deployments, such as call managers, SIP proxies, etc.

In an embodiment, the Service Level View quantifies an entity's return on investment (ROI) based on reductions in travel costs and related expenses that are achieved by holding meetings using video conferences, rather than face-to-face. ROI calculations may be performed relative to the travel costs involved between two or more sites.

In an embodiment, the Service Level View provides information on impacted business meetings by exposing the scheduled meeting events for a specific room within the context of video conference system availability and health. For example, when a particular video conference room is determined to have unacceptable operational or health issues, an administrative user can use the Service Level View to view a schedule of meeting events, so that the impact of the operational or health issues can be determined.

Figure 2:
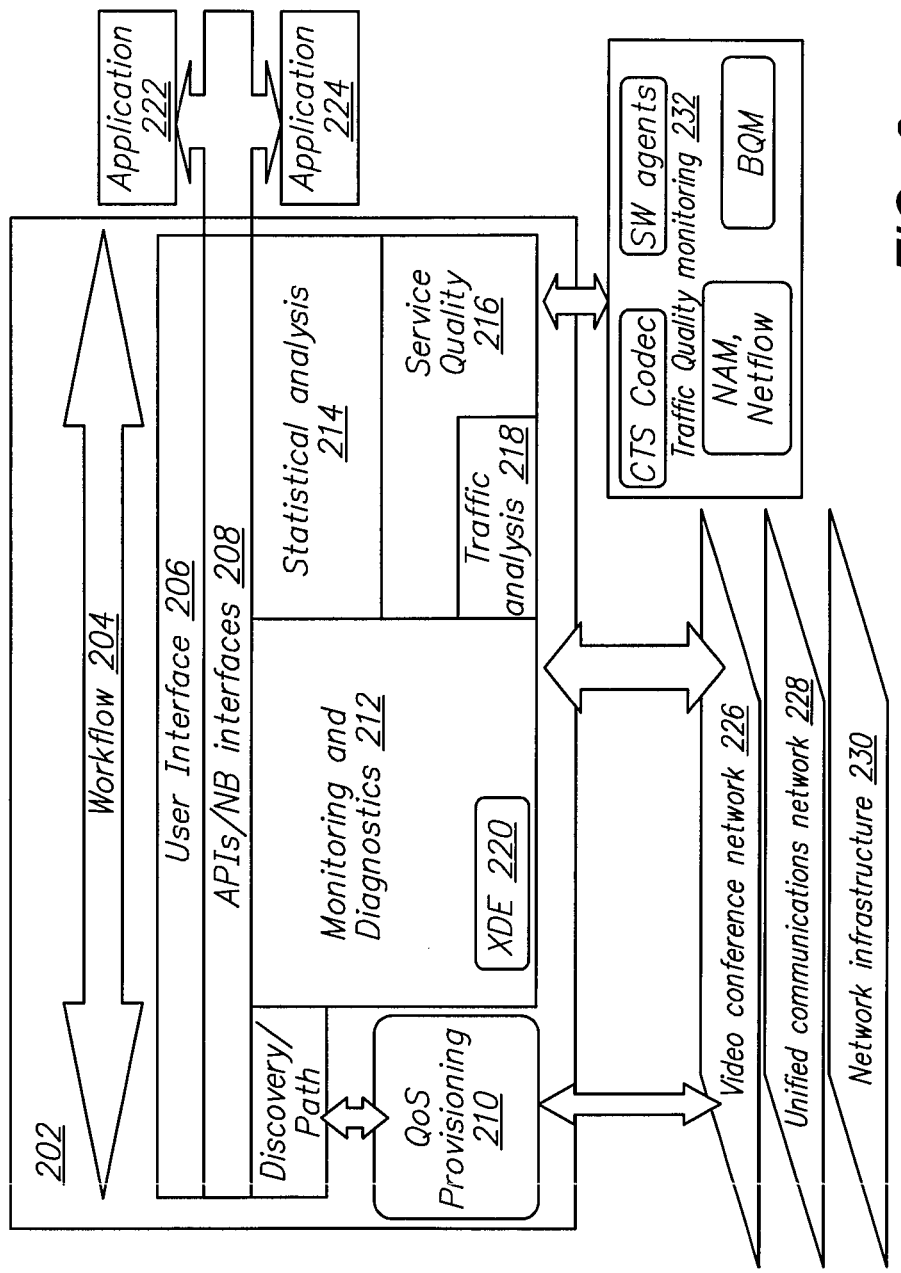
FIG. 2 illustrates a video conference network management system.

FIG. 2 illustrates a video conference network management system. In the embodiment of FIG. 2, a video conference management unit 202 manages a workflow 204 that may be implemented using a user interface 206, which is coupled to one or more application programming interfaces (APIs) or other northbound interfaces 208. The interfaces 208 may provide access for applications 222, 224 to information that is created in the unit 202.

Logically below the interfaces 206, 208 a discovery/path logic unit is configured to discover network elements that are involved in a video conference call and to discover paths between such elements. Discovered network elements can be provisioned with quality of service (QoS) values that provide treatment for video conference traffic appropriate to ensure a good user experience. In an embodiment, QoS provisioning unit 210 is configured to provision QoS values in response to instructions or commands from other elements of unit 202.

Figure 3:
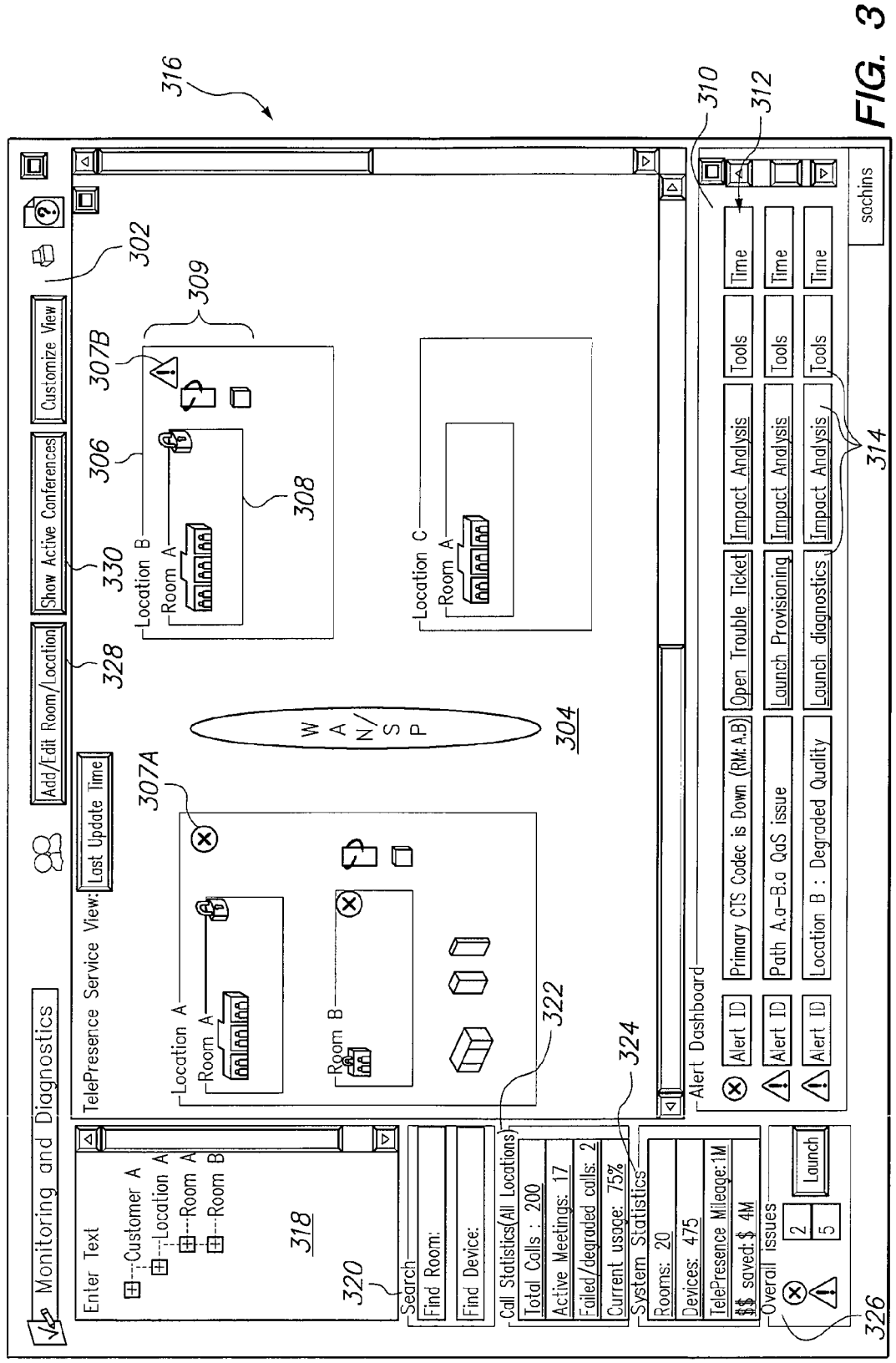
FIG. 3 illustrates an example user interface display for a video conference network management system.
Figure 4:
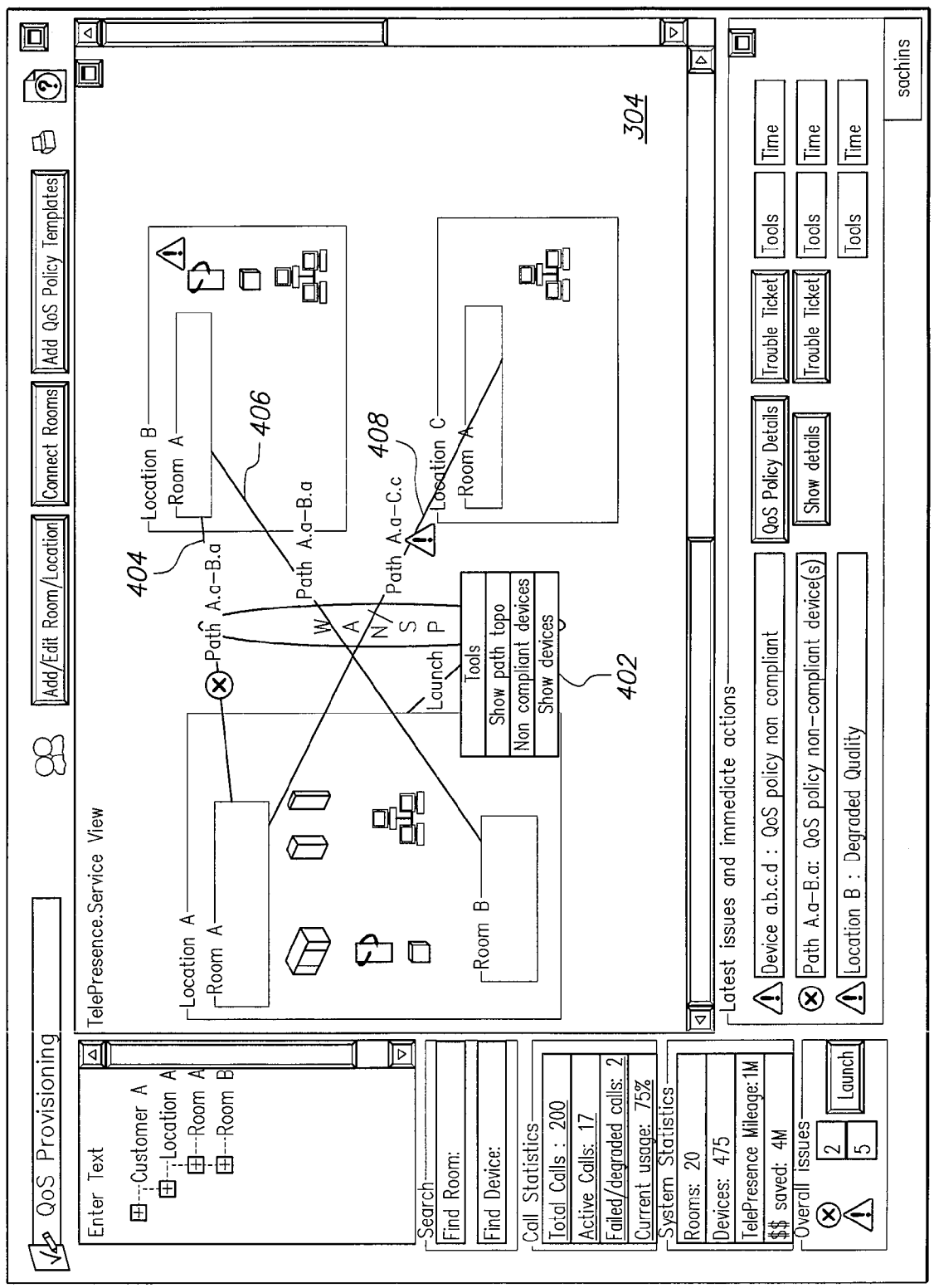
FIG. 4 illustrates a further example user interface display for a video conference network management system.
Figure 5:
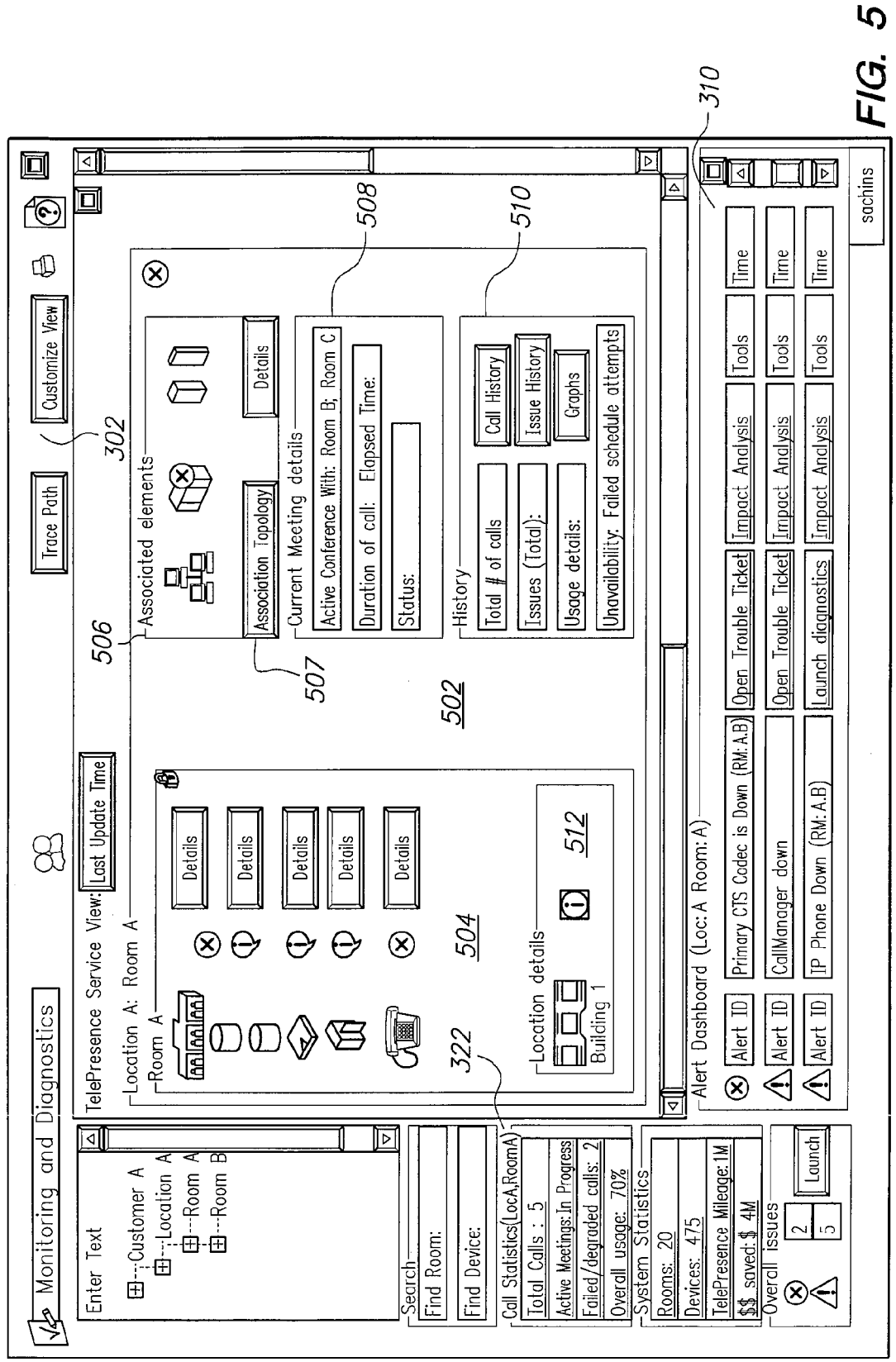
FIG. 5 illustrates a further example user interface display for a video conference network management system.

Further, discovered elements may be stored in an inventory database coupled to unit 202 and information about the discovered elements may be displayed in a system-level video conference deployment display, as further described with respect to FIG. 3, FIG. 4, FIG. 5. For example, executing one or more device discovery protocols may result in discovering multipoint switches in multiple different LAN segments, and the switches may provide location information in discovery protocol responses. Based on the responsive data, unit 202 may update the database with room identifiers and then use the data in the database as a source for generating a view of multiple rooms of an enterprise, as seen in FIG. 3. Additionally or alternatively, an administrator may configure the database with data describing known customers, locations and rooms.

Location information also can be obtained from the phone within a room such as IP phone 120A of FIG. 1. In an embodiment, such phones are configured as part of a device pool in the call manager 108. The device pool may be associated with a particular site. The site may be identified by the naming convention associated with the device pool, or the site name may be a property of the device pool.

Room location information also can be obtained, in an embodiment, from meeting scheduling software that stores information about all rooms and their geographical location details, such as address, campus building, and other information. Using such location information, the rooms can be plotted onto a geographical map.

A monitoring-diagnostics unit 212 is configured to monitor codecs, microphones, video monitors, loudspeakers, switches, routers, and other networked equipment that forms part of one or more video conference rooms. Both the QoS provisioning unit 210 and monitoring-diagnostics unit 212 are communicatively coupled to a video conference network 226, which may cooperate with or be overlaid on a unified communications network 228 and/or network infrastructure 230.

The monitoring-diagnostics unit 212 may periodically poll each monitored device in a video conference room to obtain then-current (real time) operational status information. Intelligent devices such as codecs, multipoint switches, routers, and other network elements may be polled using management protocols such as simple network management protocol (SNMP). The status of less intelligent devices such as microphones, video monitors, and cameras may be obtained by polling a codec for a video conference room, which will reply with fault data if ports or interfaces for the microphones, video monitors, or cameras are not connected or are operating at incorrect impedance or voltage levels. Based on the received status data, the monitoring-diagnostics unit 212 can update its database and can correlate data for multiple status reports to result in creating and storing aggregated data totals for a particular room.

In an embodiment, a statistical analysis unit 214 is configured to evaluate operational and performance data that is collected by the system. Statistical analysis unit 214 may be configured to aggregate data for all devices in a particular room to result in creating and storing a total number of calls in which a room is involved. Statistical analysis unit 214 also can determine which calls are active at a particular time and the endpoints of the calls to yield a total number of active meetings represented by the calls. Statistical analysis unit 214 may be configured to create and update a counter of failed calls and degraded calls. Each room under management may be represented by a row in a database table having values that identify devices in the room and other attributes of the room. Statistical analysis unit 214 may be configured to retrieve from the database of the system a total number of rooms under management, determine the number of rooms that are currently in use, and divide and scale the two values to yield a percentage of current usage.

Statistical analysis unit 214 may be configured to retrieve and display the total number of rooms under management and the total number of devices under management. These totals may be determined with database queries and arithmetic computation.

Statistical analysis unit 214 may be configured to compute a total number of travel miles saved through the use of video conference meetings. In an embodiment, in response to monitoring a SIP call end event indicating the end of a video conference call, statistical analysis unit 214 may be configured to retrieve, from a directory or other database, a city and state in which each call participant is located. Retrieval may be performed based on a user ID of each participant in the call, which may be obtained by a query to the call manager for the call. Statistical analysis unit 214 then may issue an API call to a map program or other geographical calculation unit and provide the location of the participant and a known location of a room serving as one call endpoint, with a request to calculate mileage or distance.

In response, statistical analysis unit 214 may be configured to receive a calculated mileage value and accumulate the value in the database of unit 202 for use in determining an aggregated number of miles saved through the use of video conferencing. Alternatively, the system may know, for example, from the calendar unit 102 that four (4) persons are scheduled to participate in San Jose and three (3) persons are scheduled to participate in Austin; the number of persons may be multiplied times the distance between the cities to determine a mileage figure. The database may be configured with a fixed amount per mile that is known to be saved in travel costs, a configuration variable representing cost per mile, or the database may comprise a table of fixed travel costs between known call endpoints (e.g., it costs $500 for one person to travel from San Jose to Austin for one day). Cost values may vary according to the role of the person involved in a call.

Statistical analysis unit 214 may be configured to compute total cost savings for video conference calls by multiplying the fixed per-mile amount by the number of accumulated miles in travel that were saved.

In an embodiment, a service quality unit 216 is configured to analyze traffic parameters and performance data to form a view of the overall service quality that a video conference room is providing. The service quality unit 216 may obtain service quality data from traffic monitoring sources 232 of several kinds, including directly from codecs, software agents deployed on other network elements, router- or switch-based monitoring units such as Netflow, etc. Service quality unit 216 may include a traffic analysis unit 218 that is configured to analyze traffic types, bandwidth usage, and other traffic factors.

Unit 202 may further comprise search processing logic that is configured to receive one or more keywords identifying rooms or devices, issue a query to a database associated with the unit, and display search results to a user as part of a Service Level View of the type shown in FIG. 3, FIG. 4, FIG. 5. In this way, unit 202 can implement a search function that enables a user to enter information identifying a room or device under management, and receive a display of the configuration of the room, or statistical data relating to video conference calls involving the device.

FIG. 3, FIG. 4, and FIG. 5 illustrate examples of graphical user interfaces that may be used to provide a video conference Service Level View. However, alternative embodiments may comprise different icons and text elements, while presenting the same content related to a video conference system. Thus, in various embodiments the operational summary and specific information related to faults and performance statistics described herein can be displayed in a variety of formats comprising different fonts, colors, icons, and layouts. Further, the display can be developed and rendered using a variety of tools like the Eclipse SDK, Dynamic web technologies like AJAX and DHTML, Java Swing-based thick clients, etc.

In an embodiment, a video conference Service Level View comprises, in part, a presentation of the complete operational status of a video conference system and permits a user to request and receive detailed operational status data for specific locations, rooms, and associated video conference elements.

FIG. 3 illustrates an example user interface display for a video conference network management system. In an embodiment, a user interface 302 comprises a video conference Service Level View 304, comprising a dynamic graphical layout of all video conference locations 306 and rooms 308 that the system is monitoring. There may be any number of locations 306, and any number of rooms 308 within each location. The service level view 304 may comprise a topological map of all video conference rooms associated with an enterprise, deployment, or location, for one enterprise or for multiple entities that have a customer relationship with a service provider. Using a service-level view 304 rather than a device-level view, call paths may be represented in a graphical topology, and a user may view system-wide fault data, call status data, and call utilization metrics for a large number of rooms and locations containing rooms.

The service level view 304 is graphically hierarchical using containment relationships so that a user can rapidly determine that a particular room is in a particular location and therefore near other rooms in the same location, as opposed to other locations. In an embodiment, each monitored room is represented as an icon, box or other graphical feature within view 304. In certain embodiments in which it is necessary to display a large number of rooms or locations, the view 304 comprises one or more icons that represent locations, and logic configured to generate and display a scrollable pop-up sub-window for each location when a pointing device is positioned over an icon.

In an embodiment, user interface 206 of unit 202 is configured to retrieve data from a database representing locations and rooms under management, analyze the data, and generate a graphical display as seen in Service Level View 304. In an embodiment, data in the database comprises tables of location identifiers, tables of room data in which each row represents a room and comprises a location identifier that maps a particular room to a particular location. Based on this data, logic in user interface 206 can determine a hierarchical relationship of rooms and locations and can generate the Service Level View 304 such that locations are represented with rooms contained within the locations. The user interface 206 also tracks the screen location and size of the graphical elements shown in Service Level View 304 so that locations and rooms do not overlap, or are represented as icons rather than boxes, rectangles, or similar shapes, when insufficient screen space is available to display all locations or rooms.

In an embodiment, view 304 graphically displays the various associated elements of a video conference system, such as a communications manager, a multipoint switch, and a video conference management unit. In an embodiment, the fault status of all elements, rooms, and locations are represented using one or more fault icons 307 that are displayed in association with a location 306 or room 308. The appearance, color or nature of the icon 307 may vary depending on the severity and criticality of a fault. For example, a first kind of fault icon 307A may indicate a critical fault and a second kind of fault icon 307B may indicate a non-critical fault.

In an embodiment, performing a secondary selection of an element in the view 304, such as by right clicking on any element in the display, causes the system to generate and display a context sensitive menu of data processing functions relating to the element. The context sensitive menu may have launch points for specific troubleshooting tools, device managers, related cross launches into other management applications, or QoS provisioning tools. For example, FIG. 4 illustrates a further example user interface display for a video conference network management system in which a context-sensitive menu 402 has been displayed in response to a user performing a secondary selection of a location. The menu 402 provides functional options for selecting tools, showing a path topology, identifying non-compliant devices, and showing devices on a path. Other menus may provide other functions.

In an embodiment, user interface 302 further comprises an alerts dashboard 310 displaying all active alerts affecting various components of the video conference system. In an embodiment, the alerts dashboard 310 comprises one or more rows 312 each identifying a particular alert. In an embodiment, each alert row 312 comprises an alert identifier by which an associated alert can be uniquely identified. Each alert row 312 further comprises one or more data elements for an alert, such as tool links 314, which may provide trouble ticketing, impact analysis, and other functions; a timestamp for the last update to the alert; and other data elements. In an embodiment, the specific contents of an alert row 312 vary according to the nature and severity of the associated alert. For example, a relatively minor warning might not provide an "open trouble ticket" link, but instead would provide a "launch provisioning tool" link so that the user can consider reconfiguring one or more network elements to eliminate the warning.

In an embodiment, user interface 302 further comprises a navigation panel 316. In an embodiment, navigation panel 316 comprises a plurality of elements, although alternative embodiments may have more or fewer elements. In one embodiment, a hierarchical representation 318 is provided of the video conference rooms organized by customer and location. Thus, a service provider may use the navigation panel 316 to manage multiple customers having discrete networks with different locations and rooms. In an embodiment, selecting an item in the hierarchical representation 318 causes the service level view 304 to update to show the selected item. Consequently, the service level view 304 becomes scalable to a large number of locations and rooms. The hierarchical representation 318 can identify a large number of locations and rooms in a hierarchical list, and if it is not possible to show all locations or rooms in the service level view 304, then the user can select a subset of the rooms or locations and display only the selected rooms and locations in the view.

Navigation panel 316 may further include one or more search boxes 320 for identifying locations, rooms, and devices. Search boxes 320 are responsive to user input identifying locations, rooms or devices in whole or in part, by name, model number, or keyword.

Navigation panel 316 may further include a call statistics panel 322 that provides names and values for one or more overall system level conference call statistics or metrics. Examples include total calls then currently occurring, total number of meetings that are then currently active, total number of failed or degraded calls, and total percentage of current video conference room usage.

Navigation panel 316 may further comprise a systems statistics panel 324 that provides overall system inventory statistics. In an embodiment, systems statistics panel 324 displays a summary of cost savings based on conference completions and configured travel costs between video conference locations. Cost savings may be indicated in a currency such as dollars, or in the aggregate distance in travel that has been saved, expressed in a distance unit such as miles, kilometers, etc. Alternatively, both cost and distance savings may be displayed. The panel 324 also may indicate the total number of video conference rooms under management, and the total number of network devices involved in the rooms.

In an embodiment, navigation panel 316 further comprises a fault summary 326 that displays the total number of each category of faults across all locations among multiple locations under management.

In an embodiment, an add room button 328 enables a user to add or delete rooms or locations to the display, and edit a room configuration and associated parameters. In an embodiment, a Show Active Conferences button 330 causes the system to display links between rooms that have currently active conferences. In an embodiment, links for different conferences are distinguished by colors or labels, and conference details may be obtained by clicking on a specific link or by a mouse-over.

FIG. 4 illustrates a further example user interface display for a video conference network management system. In FIG. 4, panel 304 displays a plurality of links 404, 406, 408 between rooms under management.

FIG. 5 illustrates a further example user interface display for a video conference network management system. In an embodiment, user interface 302 comprises a room information panel 502 that is obtained by selecting a specific room in the display of FIG. 3. Generally user interface 302 of FIG. 5 comprises the elements of FIG. 3, except that the information in panel 502 is specific to a particular video conference room that was selected using the display of FIG. 3.

Further, in an embodiment, information in alert dashboard 310 and call statistics panel 322 is automatically filtered based on the selected room and its video conference elements. Thus, the alerts dashboard 310 in FIG. 5 displays only alerts associated with network elements or other components of the selected room, and call statistics panel 322 shows call data only for calls involving the selected room. In an embodiment, the service level view 502 displays room elements in room elements panel 504, associated elements in an associated elements panel 506, metrics of interest in panels 508, 510, and location details in a panel 512.

In this context, "associated elements" in panel 506 means that devices in the room are connected to particular call managers, switches, or other elements that are not necessarily physically within the associated room, but have an impact on proper operation of the devices in the room. In an embodiment, an Association Topology button 507 is provided and when selected, causes logic in unit 202 to generate and display a topological representation of the devices to which the associated room elements are connected.

In an embodiment, room elements shown in room elements panel 504 include primary and secondary codecs, display screens, cameras, microphones, speakers, projectors, IP phones, and their fault status. The associated elements represented in associated elements panel 506 may include the call manager to which the video conference endpoint is registered, a SIP proxy, firewall, or other elements. In an embodiment, details about the current active conference call in which the room is participating may be shown in details panel 508. In an embodiment, a history of the conference calls that the room has participated in may be shown in history panel 510.

Location details of the room may be displayed in panel 512, such as a physical address, building name or number, or location within a campus. Information for panel 512 may reside in a database associated with unit 202.

In an embodiment, a current meeting details panel 508 comprises information identifying a currently active video conference meeting that involves the associated room shown in view 502. For example, panel 508 may display the name or nature of the call, other rooms involved, scheduled duration of the call, elapsed time if the call is in process, and status of the call. In an embodiment, a history panel 510 indicates values for historical parameters of the current video conference room. For example, history panel 510 may indicate the total number of video conference calls that have involved the room, the total number of issues, and other usage details such as the percentage of utilization. History panel 510 may comprise a call history button which when selected causes the unit 202 to generate a table or other display of details about prior calls. History panel 510 may comprise an issues history button which when selected causes the unit 202 to generate a list of issues, alerts, faults or other problems that have previously affected operation of the current room. Data for all such values and panels may be obtained from the database of unit 202.

Thus, embodiments provide a video conference Service Level View that provides the complete operational status, in terms of faults and performance, of a video conference deployment within an enterprise. In an embodiment, the Service Level View provides summarized call statistics and room-specific call statistics. In an embodiment, the Service Level View provides QoS compliance data, policy data, and policy violation data. In an embodiment, the Service Level View provides data describing overall cost savings in currency or distance resulting from an enterprise's video conference deployment.

The ability to display video conference call paths and calls in progress for particular rooms can be used to determine which business meetings will be affected for a specific room within the context of system availability and health. As a result, management decisions can be made on the amount of resources to apply to correcting an incident reported by the system based on the business impact of a particular meeting that is scheduled for that room and the associated ROI.

Embodiments are unique in providing system level views of video conference deployments, conference call statistics, and network related fault, performance, and QoS information related to video conference deployments. Further, room-level views are provided so that administrators can view information about all elements in a video conference room, rather than a list of devices, which may be difficult to correlate to room deployments. Embodiments are novel in part because the Service Level View provides the status of a video conference room in association with the video conference system components that are physically located in the room, and in association with the logical components that support video conference deployments.

Embodiments are useful to network management operators and administrators for the operational management and capacity planning of their video conference deployments. These and other users will benefit from the ability to generate and view a holistic display of an overall video conference deployment, across an enterprise or multiple sites or multiple locations, comprising video conference endpoints as well as video conference and network infrastructure, the ability to drill down into rooms to view the specific video conference physical elements and devices associated with each room along with their fault status, the graphical display of active paths and locations and the infrastructure elements involved in a conference along with information about the conference itself, such as participants, rooms, locations, or schedule, with real-time fault and service status on all displays.

Embodiments can be configured to provide end-to-end network monitoring of video conference applications, devices, platforms and connectivity monitoring, as well as network paths between rooms that carry video conference calls. Embodiments implement a video conference network monitoring model that represents multiple devices per room (video cameras, HD displays, CTS codecs, microphone, speaker, document cameras, IP phones, call managers, CTM, etc), represents multiple rooms at each location, and represents interconnections of locations and rooms to form the video conference network.

Embodiments can display a topology map providing a service level view of the video conference network model, including the network paths connecting video conference rooms and alerts on the corresponding nodes. Embodiments can display interconnectivity status among locations, rooms, and supporting devices and applications. Embodiments can provide context-sensitive tool launching based on alerts.

Embodiments can implement network and video conference path discovery to detect the network elements on the path between video conference codec locations.

In various embodiments, monitoring logic may include per room systems status, including inventory details such as type, model, manufacturer serial number, and software version, for each component; status of video cameras, codecs, displays, IP phones, and calls; monitoring connectivity among various components; and monitoring security status. Monitoring logic also may include monitoring of supporting systems and applications, such as MICROSOFT OUTLOOK, Cisco CTManager, Cisco CallManager, and multipoint switches that support multi-room video conference calls. Supporting systems also may include IP-IP gateways, Session Border Controllers, Cisco Unified Conferencing for TelePresence (CUCT) systems, etc.

Embodiments may comprise logic to implement performance and utilization analysis for video conference elements, such as CPU, memory, disk, and bandwidth usage in terms of octets in/out. Embodiments may provide trouble ticketing integration with third party systems.

Embodiments may comprise service quality monitoring logic that determines and reports, by polling and aggregating data from end-point instrumentation and mid-point instrumentation, per hop media quality metrics of many kinds. For example, for video, embodiments can report on packet loss, jitter, latency (per minute: average, min, max), as well as burst rates, frame rates, frame-type counts, packet counts (per minute: average, min, max), out of order packets, duplicate packets, late packets, remote call ID, duration of call, direction, initial bit rate and end bit rate (resolution), and total bytes and packets for the call. For audio, embodiments also can report on packet loss, jitter, delay and MOS (per minute: average, min, max), out of order packets, duplicate packets, late packets, remote call ID, duration of call, direction.

Call statistics may be generated and displayed in the service level view or its sub-panels, and may include total number of calls; percentage of successful and failed calls per room/location; call disconnects, abnormal vs. normal; and trouble indications. All such call statistics may be aggregated, generated and displayed for a particular room, or for multiple rooms in a particular location.

Usage reports and ROI analysis reports may indicate, for usage, the number of calls per week or month, and the parties and locations involved in each call. In an embodiment, ROI calculations indicate mileage based on usage and relevant travel cost savings. ROI calculations can include the number of trips, visits or travel saved from the use of video conferencing.

Capacity planning reports may include room utilization, or unavailability of rooms, meaning the number of denials of conference setups due to unavailability. Reports also may indicate the number of calls scheduled versus the number of calls actually used. Reports may indicate the meeting schedule time (room booking time) versus the time of an actual call, so that the logic then can calculate room utilization based on the percentage of booked time that was actually used for the meeting.

Other embodiments may provide video conference user experience reports that include per room and per path components availability, per room and per path media quality metrics (Delay, jitter, packet loss, MOS/VMOS etc), resource utilization for CPU, memory, disk and bandwidth, per room and per path call statistics, trouble symptoms, top five issues (disconnects, unavailability, component status, etc.), and issue isolations at particular locations such as Extranet vs. Intranet.

Service level agreement (SLA) reports may indicate location, room or device availability, bandwidth, and service quality in comparison with SLA. All such reports may be generated for the region level or location level.

3.0 Implementation Mechanisms—Hardware Overview

Figure 6:
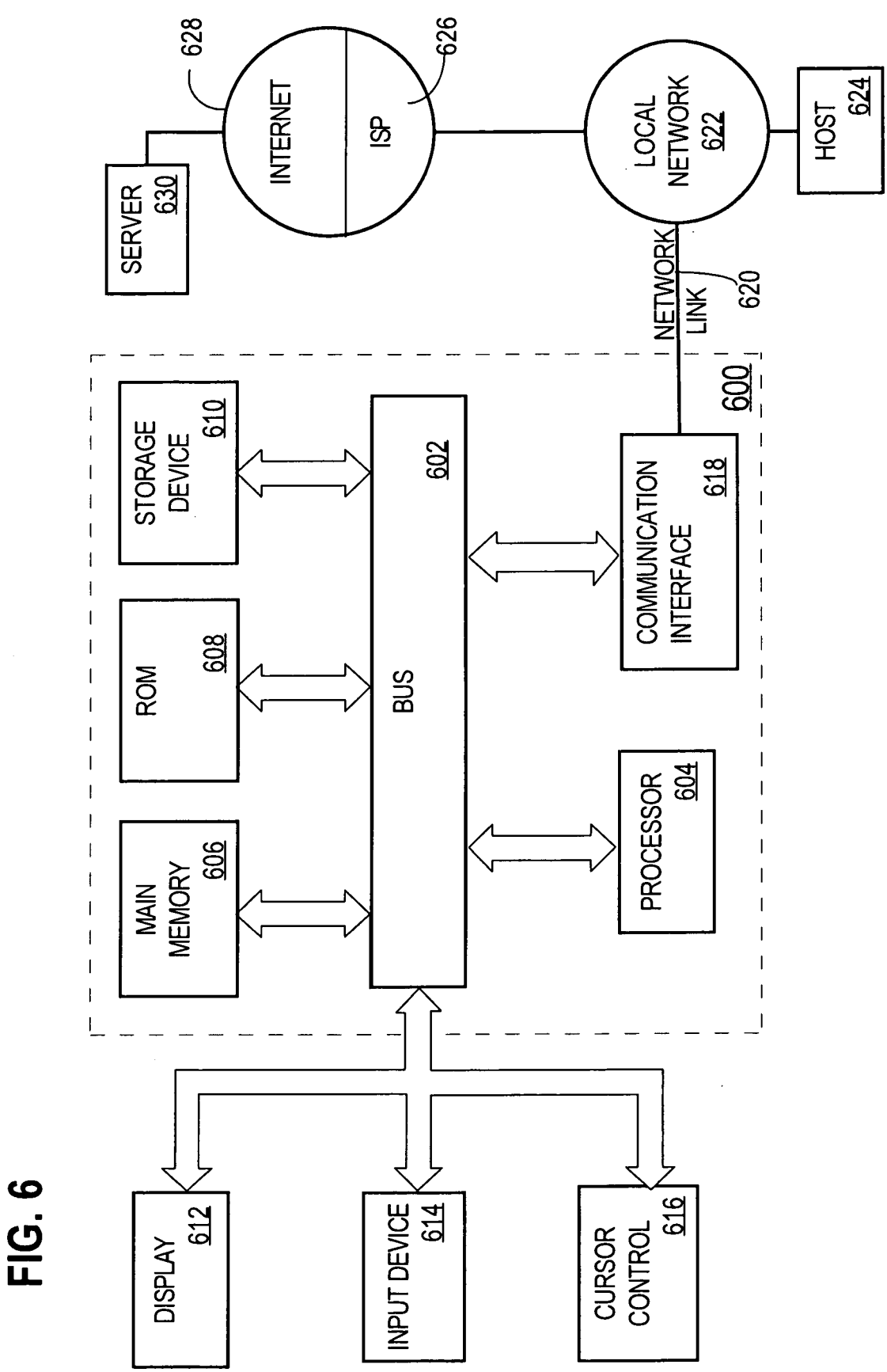
FIG. 6 illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to storage media and transmission media. Storage media includes both non-volatile media and volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

4.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory machine-readable storage medium storing one or more sequences of instructions which, when executed by one or more processors, cause the one or more processors to perform:

monitoring a plurality of video conference locations, each of the locations comprising one or more video conference rooms, resulting in creating and storing monitored data;

based on the monitored data, generating service level view data which when displayed on a video display unit cause displaying of a service level view comprising concurrent graphical representations of all the locations and all the rooms, and graphical representations of faults associated with each of the rooms;

organizing the service level view data which when displayed on the video display unit cause displaying of the service level view that presents all rooms associated with a plurality of different customers each having a plurality of locations and a plurality of rooms within the locations.

2. The machine-readable medium of claim 1, wherein the graphical representations of faults are generated and displayed in near real time in relation to a time at which the monitoring is performed.

3. The machine-readable medium of claim 1, further comprising instructions which when executed cause displaying in association with the service level view one or more of: total calls previously processed by all the locations and rooms; total number of then currently active video conference meetings involving all the locations and rooms; or percentage of current usage of all the locations and rooms.

4. The machine-readable medium of claim 1, further comprising instructions which when executed cause displaying in association with the service level view one or more of: total number of all the rooms; total number of devices in all the rooms.

5. The machine-readable medium of claim 1, further comprising instructions which when executed cause displaying in association with the service level view one or more of: total number of travel mileage saved from use of all the video conference locations and rooms; total cost savings from use of all the video conference locations and rooms.

6. The machine-readable medium of claim 1, further comprising instructions which when executed cause displaying the rooms as selectable hyperlinks associated with the rooms, receiving user input selecting one of the hyperlinks, and displaying room level view data for that room associated with the selected one of the hyperlinks.

7. The machine-readable medium of claim 1, further comprising instructions which when executed cause displaying a table of alerts associated with all rooms shown in the service level view, wherein the alerts comprise alert identifiers, alert names, and one or more of the selectable hyperlinks which when selected cause launching one or more of a trouble ticket system and an impact analysis system.

8. The machine-readable medium of claim 6, wherein the room level view data comprises a graphical representation of one or more codecs, one or more cameras, one or more video monitors, and one or more network packet data routing or switching elements, and comprises a graphical representation of a fault status of one or more codecs, one or more cameras, one or more video monitors, and one or more network packet data routing or switching elements; further comprising instructions which when executed cause re-displaying the table of alerts to show only those alerts that are associated with the room represented in the room level view.

9. The machine-readable medium of claim 1, further comprising instructions which when executed cause displaying in association with the service level view one or more graphical representations of currently active paths connecting two or more rooms that are currently involved in a video conference call.

10. The machine-readable medium of claim 1, wherein monitoring the rooms comprises monitoring, in each of the rooms, one or more codecs, one or more cameras, one or more video monitors, and one or more network packet data routing or switching elements.

11. A data processing apparatus, comprising:
one or more processors;
means for monitoring a plurality of video conference locations, each of the locations comprising one or more video conference rooms, resulting in creating and storing monitored data;
means for generating, based on the monitored data, service level view data which when displayed on a video display unit cause displaying of a service level view comprising concurrent graphical representations of all the locations and all the rooms, and graphical representations of faults associated with each of the rooms;
means for organizing the service level view data which when displayed on the video display unit cause displaying of the service level view that presents all rooms associated with a plurality of different customers each having a plurality of locations and a plurality of rooms within the locations.

12. The apparatus of claim 11, further comprising means for generating and displaying graphical representations of faults in near real time in relation to a time at which the monitoring is performed.

13. The apparatus of claim 11, further comprising means for displaying in association with the service level view one or more of: total calls previously processed by all the locations and rooms; total number of then currently active video conference meetings involving all the locations and rooms; or percentage of current usage of all the locations and rooms.

14. The apparatus of claim 11, further comprising means for displaying in association with the service level view one or more of: total number of all the rooms; total number of devices in all the rooms.

15. The apparatus of claim 11, further comprising means for displaying in association with the service level view one or more of: total number of travel mileage saved from use of all the video conference locations and rooms; total cost savings from use of all the video conference locations and rooms.

16. The apparatus of claim 11, further comprising means for displaying the rooms as selectable hyperlinks associated with the rooms, receiving user input selecting one of the hyperlinks, and displaying room level view data for that room associated with the selected one of the hyperlinks.

17. The apparatus of claim 11, further comprising means for displaying a table of alerts associated with all rooms shown in the service level view, wherein the alerts comprise alert identifiers, alert names, and one or more of the selectable hyperlinks which when selected cause launching one or more of a trouble ticket system and an impact analysis system.

18. The apparatus of claim 16, wherein the room level view data comprises a graphical representation of one or more codecs, one or more cameras, one or more video monitors, and one or more network packet data routing or switching elements, and comprises a graphical representation of a fault status of one or more codecs, one or more cameras, one or more video monitors, and one or more network packet data routing or switching elements; further comprising means for re-displaying the table of alerts to show only those alerts that are associated with the room represented in the room level view.

19. The apparatus of claim 11, wherein further comprising means for displaying in association with the service level view one or more graphical representations of currently active paths connecting two or more rooms that are currently involved in a video conference call.

20. The apparatus of claim 11, wherein the means for monitoring the rooms comprises means for monitoring, in each of the rooms, one or more codecs, one or more cameras, one or more video monitors, and one or more network packet data routing or switching elements.

21. A data processing method, comprising:
monitoring a plurality of video conference locations, each of the locations comprising one or more video conference rooms, each of the rooms comprising one or more codecs, one or more cameras, one or more video monitors, and one or more network packet data routing or switching elements, resulting in creating and storing monitored data;
generating service level view data which when displayed on a video display unit cause displaying of a service level view comprising concurrent graphical representations of all the locations and all the rooms, and graphical representations of faults associated with each of the rooms;

organizing the service level view data which when displayed on the video display unit cause displaying of the service level view that presents all rooms associated with a plurality of different customers each having a plurality of locations and plurality of rooms within the location.

22. The method of claim 21, further comprising displaying in association with the service level view one or more of: total number of travel mileage saved from use of all the video conference locations and rooms; total cost savings from use of all the video conference locations and rooms.

23. The method of claim 21, further comprising displaying the rooms as selectable hyperlinks associated with the rooms, receiving user input selecting one of the hyperlinks, and displaying room level view data for that room associated with the selected one of the hyperlinks.

24. The method of claim 21, further comprising displaying a table of alerts associated with all rooms shown in the service level view, wherein the alerts comprise alert identifiers, alert names, and one or more of the selectable hyperlinks which when selected cause launching one or more of a trouble ticket system and an impact analysis system.

25. The method of claim 23, wherein the room level view data comprises a graphical representation of one or more codecs, one or more cameras, one or more video monitors, and one or more network packet data routing or switching elements, and comprises a graphical representation of a fault status of one or more codecs, one or more cameras, one or more video monitors, and one or more network packet data routing or switching elements; further comprising re-displaying the table of alerts to show only those alerts that are associated with the room represented in the room level view.

26. The method of claim 21, further comprising displaying in association with the service level view one or more graphical representations of currently active paths connecting two or more rooms that are currently involved in a video conference call.

* * * * *